March 24, 1931. M. DOYEN 1,798,073
MEASURING ATTACHMENT FOR RECEPTACLES
Filed July 17, 1929
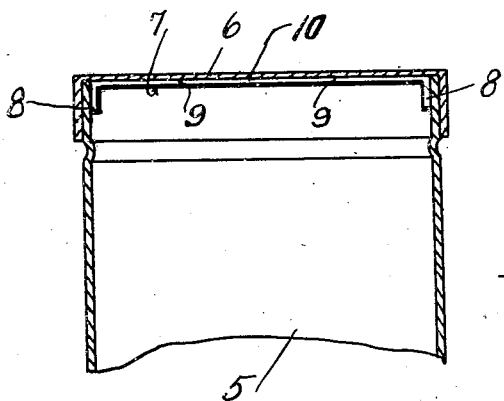
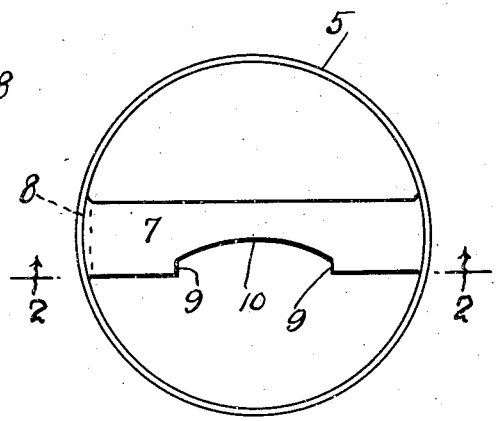
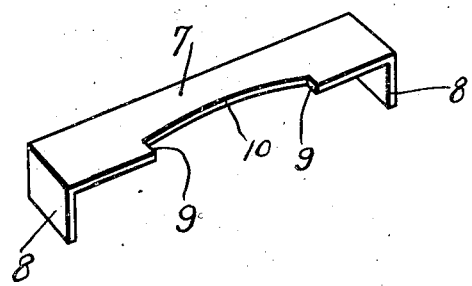
Inventor
Marie Doyen.
By Clarence A. O'Brien
Attorney Patented Mar. 24, 1931

1,798,073

UNITED STATES PATENT OFFICE

MARIE DOYEN, OF MANSON, IOWA

MEASURING ATTACHMENT FOR RECEPTACLES

Application filed July 17, 1929. Serial No. 378,902.

This invention relates to receptacles and more particularly to a measuring device in the form of an attachment adapted to be arranged within the receptacle at the open end of the receptacle so that when the spoon is employed for removing certain of the contents of the receptacle the desired amount of material adapted to be removed from the receptacle by the spoon may be obtained prior to the entire withdrawal of the spoon from the receptacle.

Another very important object of the invention is to provide a measuring device formed of an attachment of this nature which is simple in construction, may be formed integrally with the receptacle, without materially altering the construction of the receptacle, the attachment being practical, reliable, and thoroughly efficient when used for the purpose for which it is designed.

Other objects and advantages of the invention will become apparent during a study of the following description taken in connection with the accompanying drawings, wherein:

Figure 1 is a top plan view of a receptacle with the cover removed and showing the application of my invention therewith.

Figure 2 is a fragmentary detail sectional view, taken substantially on the line 2—2 and looking in the direction of the arrows, the cover being disposed on the can.

Figure 3 is a perspective view of the measuring attachment per se.

With reference more in detail to the drawings, it will be seen that I have designated generally by the reference character 5, a substantially cylindrical receptacle open at one end and provided with a cap 6 adapted to be disposed on the open end of the receptacle for closing said opening. The type of can may be such as is employed for containing baking powder and similar granular substances.

It may be well to mention here that recipes for preparing certain articles of food specify the particular amount of baking powder to be used in preparing the food according to the recipe and the measurements of the baking powder are usually given according to the spoons, that is the recipes may either call for one tablespoonful of baking soda, further specifying a level teaspoonful, a rounding teaspoonful, or a heaping teaspoonful, according to the character of the particular recipe for making a certain article of food. Obviously, if it is desired to obtain a level teaspoonful of baking powder, it is necessary that after the spoon has been inserted in the can, the baking powder on the spoon often exceeds the amount of baking powder desired, so that in the case where a level teaspoon of baking powder is called for by the recipe, it is necessary that the cook pat or scrape the spoon, for removing the excess baking powder therefrom in order to obtain a level teaspoonful of baking powder.

It is therefore, the primary object of this invention to provide a device which may form an integral part of the baking powder can and which may be used for scraping the excess powder from the spoon, in order to obtain the desired teaspoonful of baking powder. To this end, then, there is provided an elongated rectangular plate 7 formed of metal, tin or other suitable material, and at its opposite ends, the plate is bent at right angles in the same direction to provide lateral end or attaching portions 8—8. Intermediate its ends and on one longitudinal edge thereof, the plate 7 is provided with spaced shoulders 9—9 and that edge portion of the plate between the shoulders is cut away to provide an arcuate shaped recess 10.

In practice, the plate 7 is disposed crosswise of the filling opening of the can 5, flush with the upper edge of the can, and the lateral ends 8—8 of the plate is fixed to the inner wall of the can 5 at opposite diametrical points on the can, as shown to advantage in Figure 1.

The ends 8—8 may be affixed to the wall of the can in any suitable manner and through any suitable means. Thus it will be seen that if, for example, it is desired to remove from the can a level teaspoonful of baking powder the filled spoon may be drawn across the straight longitudinal edge of the plate 7, with the result that the excess baking powder will be removed from the spoon, the side edges of the spoon scraping against the straight edge of the plate 7.

Likewise, when it is desired to obtain a rounded teaspoonful of baking powder the filled ladle of the spoon is placed within the recess between the shoulders 9—9 so that the opposite edges of the ladle of the spoon will be placed across the arcuate edge 10 at the edge of the recess, so that when the material left on the spoon as the same has been drawn through the recess as just mentioned, the intermediate portion of the baking powder remaining on the spoon will be higher than at the side of the spoon so that it may be said that the material remaining on the spoon is substantially round in cross section.

It is to be further noted that by attaching the plate 7 within the can 5 as shown and described, the cover 6 may be readily placed over the filling opening of the can without interfering in any manner with the plate or measuring device 7.

In view of the apparent simplicity of my device, it is believed that a clear understanding of the construction, operation and advantages of the same will be apparent to those skilled in the art without a more detailed description thereof.

It is to be further understood that I do not wish to limit myself to the specific form of construction herein shown and described, nor in the material used in forming the measuring implement but that my invention is susceptible to certain changes in size, material used, shape, and other details fully coming within the spirit of the invention and the scope of the appended claim.

What is claimed is:

A device of the character described, comprising an elongated plate adapted to extend transversely of the filling opening of a container, said plate having one longitudinal edge thereof straight for levelling the contents of a spoon or the like, said plates on the opposite longitudinal edge thereof being provided with a pair of spaced shoulders adapted to accommodate therebetween the ladle of a spoon or the like, and said plates at the last referred to edge thereof between said shoulders being arcuate to provide an edge for removing certain of the contents of the spoon passing between said shoulders.

In testimony whereof I affix my signature.

MARIE DOYEN.